Jan. 5, 1971 T. O. PAINE 3,553,704
ADMINISTRATOR OF THE NATIONAL AERONAUTICS
AND SPACE ADMINISTRATION
PHASE MULTIPLYING ELECTRONIC SCANNING SYSTEM
Filed Aug. 11, 1969 2 Sheets-Sheet 1
FIG. 1
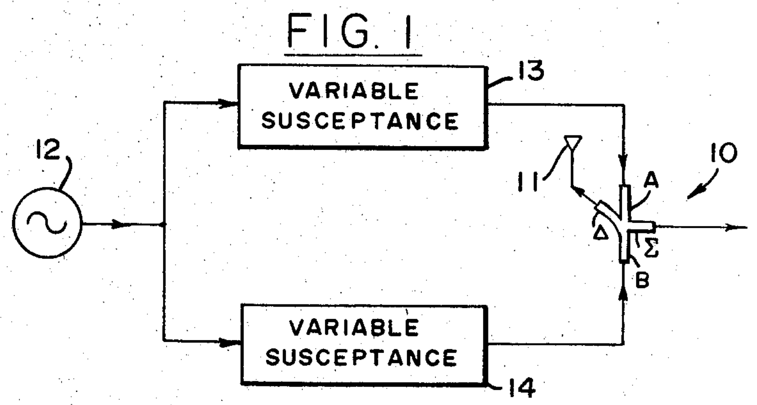
FIG. 2
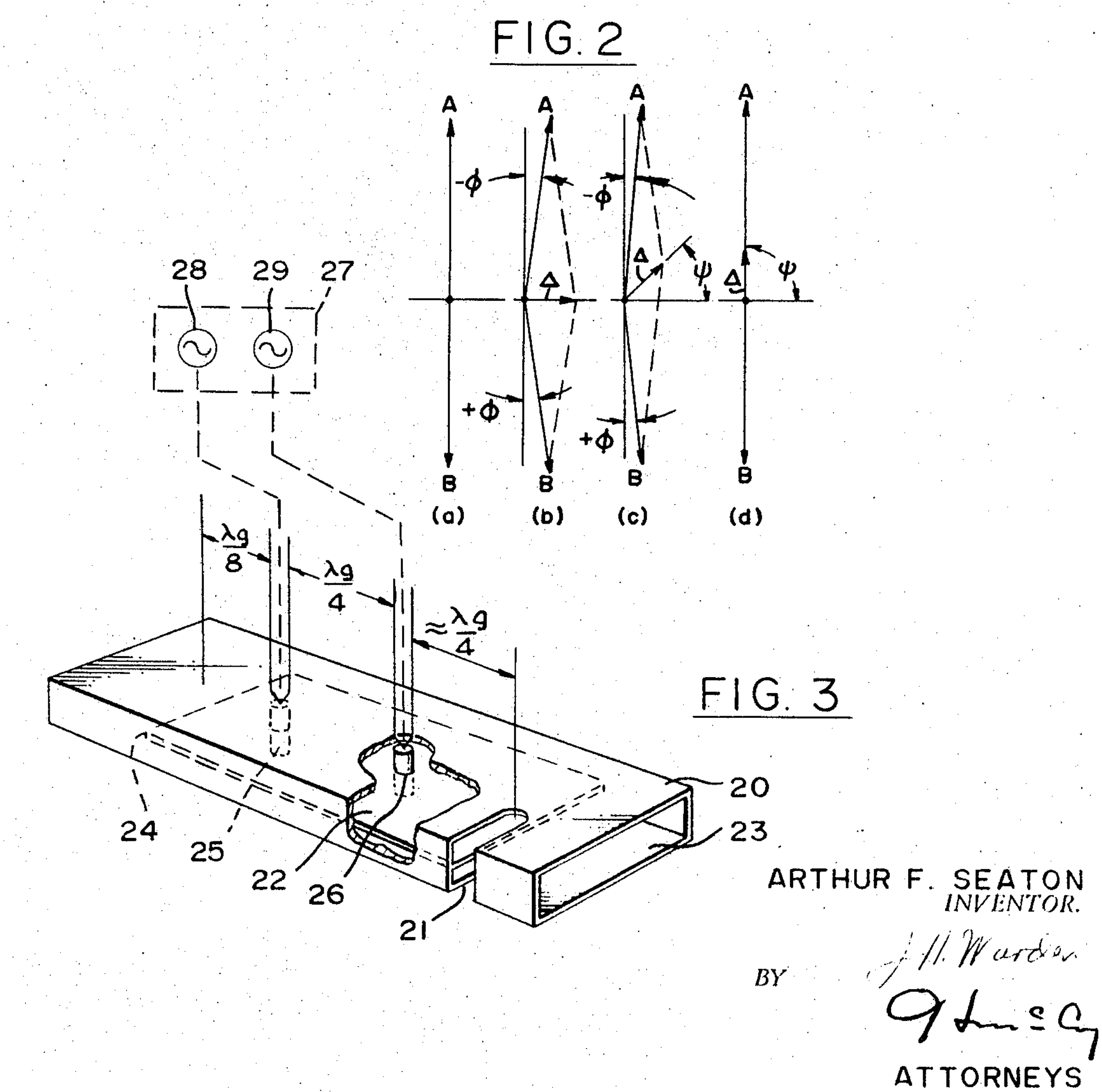
FIG. 2, FIG. 3
ARTHUR F. SEATON
INVENTOR.
BY
ATTORNEYS

INVENTOR.
ARTHUR F. SEATON

BY

ATTORNEYS 3,553,704
PHASE MULTIPLYING ELECTRONIC SCANNING SYSTEM

T. O. Paine, Administrator of the National Aeronautics and Space Administration, with respect to an invention of Arthur F. Seaton, Palos Verdes Estates, Calif.
Filed Aug. 11, 1969, Ser. No. 848,811
Int. Cl. H01p 5/12; H01q 13/10; H03h 7/36
U.S. Cl. 343—768 13 Claims

ABSTRACT OF THE DISCLOSURE

A hybrid T waveguide junction is disclosed comprising a septum bifurcating a waveguide with variable susceptance in the two resulting branches for controlling the phase and amplitude of radiant energy through each. The difference in radiation through the two branches is then radiated out of an arm comprising an edge (narrow wall) slot and the remaining energy is transmitted through another arm comprising a waveguide continuation beyond the septum and edge slot. The variable susceptance in a given branch comprises voltage variable capacitances in the form of adjustable stubs. The control for the stubs may be in accordance with sine and cosine functions.

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

The invention relates to a method and apparatus for electronic control of the phase and amplitude of an electronic signal.

In microwave slot antenna arrays, it is frequently desirable to be able to both scan and control the width of the beam. The prior art in electronic scanning techniques for antenna arrays is large and varied. Two techniques which operate in the transmitter and receiver respectively, are frequency scanning and signal processing of a received signal. Other techniques involve phase shifting the transmitted signal, such as through a ferrite phase shifter or a varactor diode phase shifter.

Each of these techniques has problems or undersirable characteristics of one type or another. The frequency scanning technique requires a very large bandwidth for the system and the signal processing technique (which operates on the received signal only) requires complex data processing procedures. In the phase shifting technique, the phase shifters employed have been unsatisfactory. For example, the ferrite phase shifter results in a system that is very heavy and requires heavy currents to drive the ferrites and the varactor diode phase shifters are very lossy for RF and higher frequencies.

It would be desirable to have a simple electronic scanning system for antenna arrays that can be programmed to provide not only complete phase control over the signal radiated by each element, but amplitude control as well. The pattern characteristics of the array could then be changed at will and the resulting pattern can be scanned readily over wide angles in the far field. In addition, the beam width may be changed at will by amplitude control.

SUMMARY OF THE INVENTION

In accordance with the present invention, a hybrid waveguide junction having two input arms and two output arms is employed to obtain amplitude and phase control of a signal transmitted through one output arm in response to a signal divided between the two input arms, with amplitude and phase control provided by varying separately the susceptance in the two input arms.

The susceptances are normally so balanced that no signal is transmitted through the one arm output and only small changes in susceptance are needed in the paths of the two branch arms to unbalance the junction and cause controlled signal transmission through the one arm.

In the microwave region, all the phase and amplitude control functions can be performed by a relatively simple configuration comprising a waveguide having an edge (narrow wall) slot with no tilt angle, a septum that bifurcates the waveguide in front of the slot, and two variable capacitive devices between the broadwalls of each of the two half-height waveguides with a quarter wavelength space between the two variable capacitance devices. The septum terminates at the edge of the slot so that the slot functions as the difference arm coupled to input arms comprising the half-height waveguides formed by the septum in the waveguide.

BRIEF DESCRIPTION OF THE DRAWINGS

FIG. 1 is a branching circuit schematic which illustrates the technique of the present invention.

FIG. 2 illustrates vectorially the technique of FIG. 1.

FIG. 3 shows isometrically, and somewhat schematically, a preferred embodiment of apparatus for the present invention.

Figure 4:
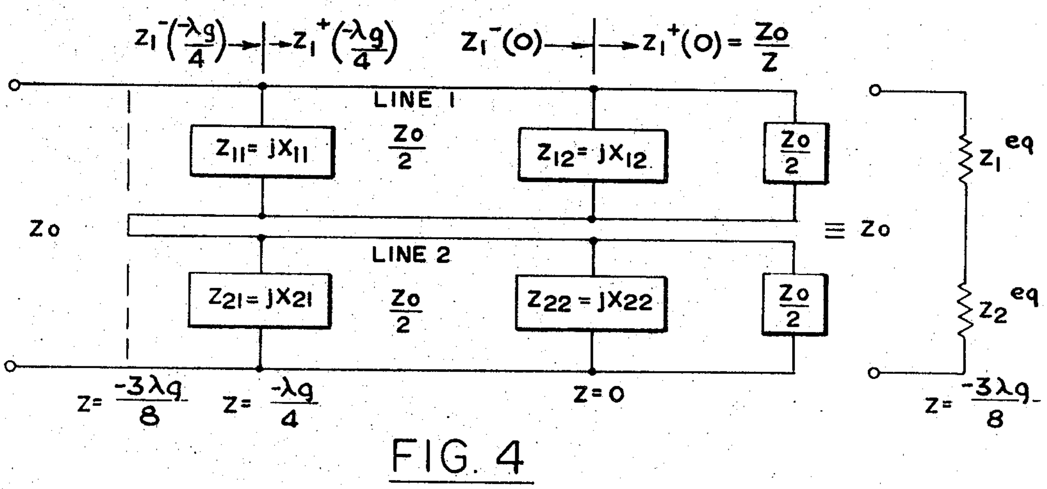
FIG. 4 is an equivalent circuit of the aparatus of FIG. 3.

The novel features that are considered characteristic of this invention are set forth with particularity in the appended claims. The invention will best be understood from the following description when read in connection with the accompanying drawings.

DECRIPTION OF THE PREFERRED EMBODIMENTS

Referring now to FIG. 1, the novel principle of the present invention is illustrated by a schematic diagram of a branching circuit comprising a junction 10 having two input arms A and B, a first output arm Σ for the sum of the signals in the arms A and B, and an output arm Δ for the difference of the signals in the arms A and B. The Δ-arm is directly coupled to a radiating element 11 such as a dipole or slot of an antenna array. A signal source 12 is connected to the arms A and B of the junction 10 by variable susceptance branches 13 and 14 through which phase shift and amplitude control is maintained over the signal in the Δ-arm. In other words, the amplitude and phase of the signal appearing at the difference arm (and hence radiated) are controlled by varying the susceptance of the branches 13 and 14 connected to the arms A and B.

The susceptances are normally balanced positive and negative in the branches 13 and 14, respectively, so that no radiation takes place. Then only small changes in susceptance are needed in the branches 13 and 14 to unbalance the circuit and cause a controlled radiation of any phase angle with respect to the input signal and at the desired amplitude. Therefore, the line lengths in the varable susceptance branches 13 and 14 are assumed to be electrically equal when the susceptances are equal.

Initially, equal susceptance in the branches 13 and 14 is assumed for equal power division and the phase shift through each of the branches 13 and 14 is assumed to be equal to zero. Then in the junction 10, all power will recombine in the Σ-arm and none will come out of the Δ-arm to which the radiating element 11 is connected. The vector representation of signals in the difference arm is shown to be zero in FIG. 2*a*, for this balanced condition.

If a phase shift $\phi$ of a small value is assumed in the susceptance branch 13, and a phase shift $+\phi$ of opposite sign but equal magnitude is assumed in the susceptance branch 14, the signal into the arm A of the junction 10 is retarded while the signal into the arm B is advanced. The balance of the hybrid is now changed and a component of signal appears in the Δ-arm with the phase shown in FIG. 2*b*.

If the susceptance branch 13 is then allowed to direct a slightly larger signal into the arm A than the susceptance branch 14 allows into the arm B, and the phase shift through the susceptance branches 13 and 14 is reduced so as to keep the power from the difference arm Δ constant, the vector diagram will appear as in FIG. 2*c*. A change in phase of $\Psi$ in the Δ-arm as compared with the balanced power condition is shown. If the power condition is allowed to become more unbalanced in the same direction while the phase shift through the susceptance branches 13 and 14 are reduced to zero degree, the signal in the Δ-arm will then be as shown by the vector diagram of FIG. 2*d*. It is apparent that the phase of the signal in the Δ-arm has changed by 90° from the balanced power condition of FIG. 2*b*. However, the phase shift of the signal as directed into the arms A and B was only a small fraction of 90°.

By a continuation of this susceptance control process over power and phase shift, the phase of the signal in the Δ-arm can be scanned through 360° with a constant amplitude. If the amount of signal coupled out of the Δ arm is small, the following approximations hold:

$$\phi = K \cos \Psi \quad (1)$$

$$|A/B| = K \sin \Psi \quad (2)$$

where $\phi$ is the magnitude of the phase shift through the susceptance branches 13 and 14, $\Psi$ is the desired phase angle in the Δ-arm, A is the power into the A-arm and B is the power into the B-arm.

The power transmitted through the Σ-arm is diminished by the power transmitted through the Δ-arm to the radiating element 11, but sufficient power will remain to feed another radiating element through a similar branching circuit. Thus the branching circuit of FIG. 1 becomes the signal source for the next branching circuit in cascade. A series of such circuits could be cascaded and modulated for a steerable antenna array. A programmer not shown would provide the correct modulation for each radiating element to provide for it the desired phase shift $\Psi$ for proper scanning.

It should be noted that whereas operation of the circuit of FIG. 1 is described with reference to FIG. 2 for variable phase shift of a signal of constant amplitude through the Δ-arm, variable amplitude with a constant phase angle $\Psi$ may be readily achieved by simply varying the phase shift through the variable susceptance branches 13 and 14 with equal power into the arms A and B. That would be desirable for varying the beam width of the radiation pattern from an array of radiating elements. With only slightly more sophisticated modulation, the circuit of FIG. 1 may be used to control both the amplitude and the phase of the signal into the Δ-arm.

To make the circuit of FIG. 1 practical for antenna scanning and beam width control, major simplifications must be made in packaging the variable susceptance branches with a microwave junction as shown in FIG. 3 which couples radiating energy directly out of the circuit. It consists of a waveguide 20 having an edge slot 21 with no tilt angle for direct radiation. A septum 22 bifurcates the waveguide in front of the slot 21 to form input arms A and B. They feed power to a Δ-arm comprising the slot 21 and an Σ-arm comprising an end port 23. Thus, two branch lines comprising arms A and B (and sometimes referred to hereafter as branches) set up by the septum 22 cooperate with the edge slot 21 and the end port 23 of the waveguide 20 to make up a degenerate form of the folded E-plane hybride T waveguide junction.

The leading edge 24 of the septum divides the power of the input signal through the branches A and B above and below the septum 22 respectively in the waveguide 20. However, the ratio of the power into the branches A and B depends upon the position of two capacitive stubs 25 and 26 which are located in holes in the septum 22. The length of each stub is less than the *b* dimension of the waveguide so that each is free to move back and forth from one branch of the waveguide into the other. When both are centered on the septum, they present a matched impedance at the leading edge 24, and there is no differential phase shift in the branches.

For maximum control of amplitude and phase of signal out of the slot 21 by positioning the stubs 25 and 26, the stub 25 is placed a distance $\lambda_g/8$ from the leading edge 24 and approximately $\lambda_g/2$ from the trailing edge of the septum 22 which terminates at the edge of the slot 21. The stub 26 is then placed a distance $\lambda_g/4$ from the stub 25.

If both stubs 25 and 26 are moved upwardly into branch A, a differential phase shift $\phi$ is generated in the branch A while an opposite and equal differential phase shift is generated in the branch B. If a different stub is displaced into each of the branches A and B, an unbalance in the power division is set up.

Because of the delicately balanced nature of a hybrid T waveguide junction, a precise means is required for control of the capacitive stubs 25 and 26 which operate in the branches A and B to provide the variable susceptance elements 13 and 14 with variable power division at the leading edge 24 of the septum 22. The use of piezoelectric crystals for the necessary control over the stubs 25 and 26 for very small movements may be provided in a manner to be described with reference to FIG. 6 since they provide precise expansion or contraction in certain directions directly proportional to the voltage applied thereto.

Before describing the particular arrangement of FIG. 6, a mathematical analysis will be given for the control of a set of the stubs 25 and 26 as one type of variable reactance that can be used. In practice other types of variable reactances may prove just as useful, and when less lossy varactor diodes become available, they could be used instead of the stubs 25 and 26. However, it should be understood that in its broadest aspects a hybrid T waveguide junction is not required. Instead, a hybrid ring or magic T waveguide junction may be employed with different variable susceptance arrangements. At lower frequencies, the same principles may be employed with coaxial lines or strip transmission lines. A rigorous mathematical analysis would, of course, be different for each configuration. Accordingly, the analysis that follows is for the configuration of FIG. 3 using capacitive stubs in a degenerate form of the folded E-plane hybride T in a waveguide.

For the purposes of notation in FIG. 3, the arms A′ and B′ will be referred to as lines 1 and 2 with ports 1 and 2 at the leading edge 24 of the septum 22 and ports 1′ and 2′ at the slot 21. The slot 21 and the end port 23 will be referred to as ports 3 and 4, respectively. Thus, considering the junction at the slot 21, the 4-port junction can be made to behave like a combination of a microwave hybrid junction and a narrow wall slot radiator, if each port is assumed to be matched.

To effect coupling of the slot 21 in a controllable manner, discrete discontinunities are positioned $\lambda_g/4$ apart along the bifurcating septum and each discontinuity is purely susceptive (reactive) and adjustable. The discontinuities for practical purposes are taken here to be the two capacitive stubs 25 and 26 located in holes in the septum 22. The equivalent circuit of the bifurcated transmission line segment of the 4-port controlling network with its discontinuities suitably labeled for the following analysis is shown in FIG. 4.

Briefly stated the objective of the phase multiplying scheme is to vary the four reactances, or susceptances since $X_{ij}=(-B_{ij})-1$, in such a fashion as to produce an output voltage $V^{out}$ across the slot, that may be phase controlled while maintaining $$Z_{\text{Total}}\left(\frac{-3\lambda_g}{8}\right)=Z_0$$

for all time, *t*. The mathematical objective is twofold: an equation must be obtained that relates $$Z_{\text{Total}}\left(\frac{-3\lambda_g}{8}\right)=Z_1^{eq}\left(\frac{-3\lambda_g}{8}\right)+Z_2^{eq}\left(\frac{-3\lambda_g}{8}\right)$$

to the $X_{ij}$; and an equation must be derived that relates $V^{out}=V^{slot}=V^{out}\ (V_1^{out},\ V_2^{out})$ to the $X_{ij}$, where $V_1^{out}$ and $V_2^{out}$ are output voltages across the ports 1′ and 2′.

The following major assumptions are made, therefore, to simplify the complicated expressions which would otherwise result: Both branches A′ and B′ appear terminated electrically in their equivalent waveguide impedance $Z_0/2$, a condition that is satisfied when the 4-port junction which includes the radiating slot 21 is properly matched to become a matched hybrid junction; and eacn of the time-modulated reactances $X_{ij}$ (normalized to $Z_0/2$) never exceeds a value of 0.1. With the equivalent circuit of FIG. 4 and the aid of the transmission line equation $$\frac{Z_i}{Z_0}=\frac{Z_{\text{load}}+jZ_0\tan\beta l}{Z_0+jZ_{\text{load}}\tan\beta l} \qquad (3)$$

where $$\beta=\frac{2\pi}{\lambda_g}=\frac{2\pi}{\text{wavelength}}$$

the expressions for the equivalent impedances of parts 1 and 2 at the leading edge of the septum can be derived. Normalized to their waveguide impedance $Z_0/2$, they are, respectively, $$Z_1^{eq}\equiv\frac{Z_1\left(\frac{-3\lambda_g}{8}\right)}{Z_0/2}=\frac{\frac{X_{11}}{X_{12}}-\frac{X_{11}}{Z_0/2}+\frac{Z_0/2}{X_{12}}+j\left(\frac{X_{11}}{Z_0/2}+1\right)}{\left(1-\frac{X_{11}}{Z_0/2}\right)+j\left(\frac{X_{11}}{Z_0/2}-\frac{Z_0/2}{X_{12}}+\frac{X_{11}}{X_{12}}\right)} \qquad (4)$$

$$Z_2^{eq}\equiv\frac{Z_2\left(\frac{-3\lambda_g}{8}\right)}{Z_0/2}=\frac{\frac{X_{21}}{X_{22}}-\frac{X_{21}}{Z_0/2}+\frac{Z_0/2}{X_{22}}+j\left(\frac{X_{21}}{Z_0/2}+1\right)}{\left(1-\frac{X_{21}}{Z_0/2}\right)+j\left(\frac{X_{21}}{Z_0/2}-\frac{Z_0/2}{X_{22}}+\frac{X_{21}}{X_{22}}\right)} \qquad (5)$$

It is found more convenient to express $Z_1^{eq}$ and $Z_2^{eq}$ in terms of normalized susceptances rather than in terms of reactances. If $$X_{ij}\Big/\frac{Z_0}{2}$$

is denoted by $(-B'_{ij})^{-1}$, Equations 4 and 5 become $$Z_1^{eq}=\frac{Z_0}{2}\,\frac{2-j2(B'_{11}B'_{12})}{2+2(B'_{11}-B'_{12})+(B'_{11}-B'_{12})^2+2B'_{11}B'_{12}+(B'_{11}B'_{12})^2} \qquad (6)$$

$$Z_2^{eq}=\frac{Z_0}{2}\,\frac{2-j2(B'_{21}B'_{22})}{2+2(B'_{21}-B'_{22})+(B'_{21}-B'_{22})^2+2B'_{21}B'_{22}+(B'_{21}B'_{22})^2} \qquad (7)$$

It is known that only small changes are required in the phase and amplitude of the waves emerging from ports 1′ and 2′ to produce full phase variation in the difference signal generated in port 3. It is also known that small changes in phase and amplitude can be generated by small changes in the susceptances that load the line. With reference to FIG. 4, these susceptances may then be represented by the $B'_{ij}$ introduced into branches A′ and B′. Adequate slot control should therefore be provided by the small metallic stubs 25 and 26.

It is assumed that the two stubs 25 and 26 are of equal length, common to both lines, and are of sufficient length to produce observable variations in both guides but just short enough so that maximum protrusion into either guide does not violate the condition:

$$B'_{ij}\leqslant 0.1 \qquad (8)$$

It is also assumed that the variation in $B'_{ij}$ is measured or regarded as a deviation from the equilibrium position, with the equilibrium position defined as the position of the stub that gives equal susceptance in both lines (equal protrusion into both lines). Hence, the following relations are established.

$\Delta_0$=the equilibrium position $\Delta_{11}$=the movement of the stub 25 in line 1 from its equilibrium position $\Delta_{21}$=the movement of the stub 25 in line 2 from its equilibrium position $d_{11}$=length of stub 25 in line 1$=\Delta_0+\Delta_{11}$ $d_{21}$=length of stub 25 in line 2$=\Delta_0+\Delta_{21}$ where $$d_{11}=d_{21}=\Delta_0 \text{ at equilibrium position} \qquad (10)$$

and $$\Delta_{11}=-\Delta_{21}$$

The condition of Equation 10 is necessary to satisfy the condition of constant stub length $$(l=d_{11}+d_{21}=2\Delta_0=\text{constant})$$

Because of the small stub insertion assumed, there is a direct linear correspondence between insertion and susceptance as follows:

$$\begin{aligned}B'_{11}&=B_0+\delta_{11}\\B'_{21}&=B_0+\delta_{21}\\B'_{12}&=B_0+\delta_{12}\\B'_{22}&=B_0+\delta_{22}\end{aligned} \qquad (11)$$

$\delta_{11}$, $\delta_{21}$, $\delta_{12}$ and $\delta_{22}$ are changes in susceptance due to respective changes $\Delta_{11}$, $\Delta_{21}$, $\Delta_{12}$ and $\Delta_{22}$ so that $$\begin{aligned}\delta_{11}&=-\delta_{21}\\\delta_{12}&=-\delta_{22}\end{aligned} \qquad (12)$$

The subscripts 12 and 22 refers to changes in $B'_{12}$ and $B'_{22}$ produced by the stub 26 in respective lines 1 and 2 (branches A′ and B′). Of course, to satisfy Equation 8, the $\Delta_{ij}$ and $\delta_{ij}$) of Equations 9 and 11 are physically limited.

In view of Equations 8, 9 and 12, terms like $(B'_{ij})^2$ and $B'_{ij}B'_{jj}$, which are less than or equal to 0.01, can be neglected and Equations 6 and 7 can be reduced to the forms $$Z_1^{eq}=\frac{Z_0}{2}\left[1-(\delta_{11}-\delta_{12})+\frac{1}{2}(\delta_{11}-\delta_{12})^2\right] \quad (13)$$

$$Z_2^{eq}=\frac{Z_0}{2}\left[1+(\delta_{11}-\delta_{12})+\frac{1}{2}(\delta_{11}-\delta_{12})^2\right] \quad (14)$$

It is to be noted that, in the derivation of Equations 13 and 14 and of most of the equations which follow, extensive use is made of the binomial expansion. The total input impedance in the plane of the leading edge of the septum is thus derived.

$$Z=Z_1^{eq}+Z_2^{eq}=Z_0[1+\tfrac{1}{2}(\delta_{11}-\delta_{12})^2] \quad (15)$$

Figure 5:
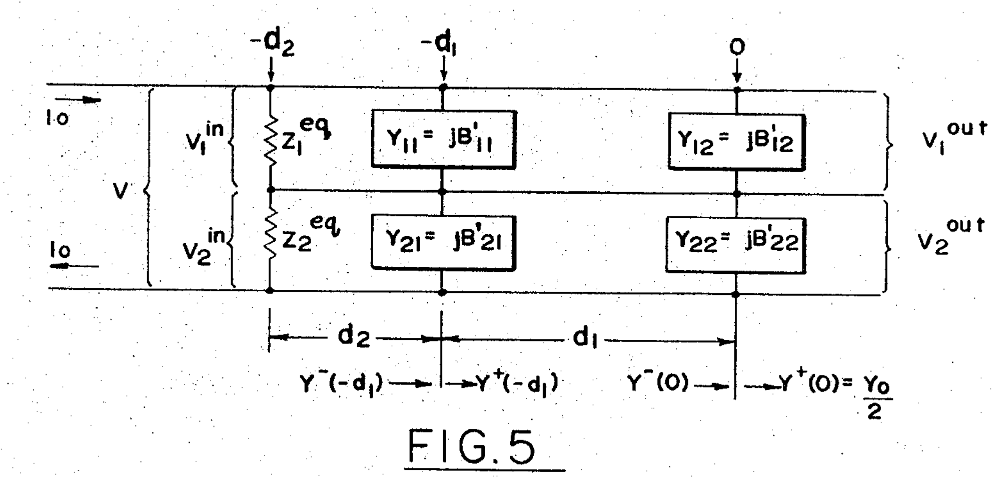
FIG. 5 is an equivalent control network for the apparatus of FIG. 3.

It now remains to derive the expression of the output voltage of port 3 in terms of $\delta_{11}$ and $\delta_{12}$ with reference to FIG. 5. Since $Z_1^{eq}$ and $Z_2^{eq}$ are in series with one another, the following expressions apply.

$$V=V_1^{in}+V_2^{in} \quad (16)$$

where V is the voltage of a traveling wave incident on ports 1 and 2.

$$V_1^{in}=I_0Z_1^{eq} \quad (17)$$

$$V_2^{in}=I_0Z_2^{eq} \quad (18)$$

From Equations 17, 18, 13 and 14, $$V_2^{in}=V_1^{in}[1+2(\delta_{11}-\delta_{12})+2(\delta_{11}-\delta_{12})^2] \quad (19)$$

Since $Z_1^{eq}$ and $Z_2^{eq}$ are pure real values, $V_1^{eq}=V_1^{in}$ and $V_1^{eq}=V_2^{in}$ are in phase and related in magnitude only.

The transmission line voltage equations are:

$$V(-d_1)=V^{out}[\cosh j\beta d_1+Y^-(o)\sinh j\beta d_1] \quad (20)$$

$$V(-d_2)=V(-d_1)[\cosh j\beta d_2+Y^-(-d_1)\sinh j\beta d_2]=V^{in} \quad (21)$$

where $V(-d_1)$ and $V(-d_2)$ are the voltages at the reference planes $-d_1$ and $-d_2$, respectively. Equations 20 and 21 can be used with reference to FIG. 5 to obtain $$Y^-(0)=1+jB'_{12} \quad (22)$$

$$Y^-(-d_1)=Y\left(-\frac{\lambda_g}{4}\right)=\frac{B'_{11}+j(B'_{11}B'_{12}-1)}{B'_{12}-j1} \quad (23)$$

where $Y^-(o)$ and $Y^-(-d_1)$ are the admittances of the line just to the left of the reference planes $o$ and $-d_1$, respectively. Then:

$$V_1^{in}=V_1^{out}\frac{e^{j\pi}}{2}[1+B'_{12}-B'_{11}B'_{12}+j(B'_{11}-1)] \quad (24)$$

$$V_2^{in}=V_2^{out}\frac{e^{j\pi}}{\sqrt{2}}[1+B'_{22}-B'_{21}B'_{22}+j(B'_{21}-1)] \quad (25)$$

With the use of Equations 16 and 19 and the condition of Equation 8, the input voltages of ports 1 and 2 can be expressed in terms of the voltage of the incident traveling wave, V:

$$V_1^{in}=\frac{V}{2}[1-(\delta_{11}-\delta_{12})] \quad (26)$$

$$V_2^{in}=\frac{V}{2}[1+(\delta_{11}-\delta_{12})] \quad (27)$$

And substitution of Equations 26 and 27 into Equations 24 and 25, respectively, yields the two output voltages at ports 1' and 2':

$$V_1^{out}=V\frac{e^{-j\pi}}{2\sqrt{2}}[1-(\delta_{11}-\delta_{12})+B'_{11}+j\{1-(\delta_{11}-\delta_{12})-B'_{12}\}] \quad (28)$$

$$V_2^{out}=V\frac{e^{-j\pi}}{2\sqrt{2}}[1+(\delta_{11}-\delta_{12})+B'_{21}+j\{1+(\delta_{11}-\delta_{12})-B'_{22}\}] \quad (29)$$

The output voltage of the slot 21 is finally derived. If some constant of proportionality for the slot (which is near unity when the four-port hybrid is well matched) is neglected, the difference of Equations 28 and 29 yields $$V^{out}=\frac{V_e^{-j\pi}}{\sqrt{2}}[\delta_{12}-j\delta_{11}] \quad (30)$$

The signal transmitted into port 4 is also obtained from the sum of Equations 28 and 29:

$$V^{trans}=\frac{V_e^{-j\pi}}{\sqrt{2}}[1+B_0+j(1-B_0)] \quad (31)$$

Equation 30 shows that the signal radiated from the slot 21 is dependent solely on the susceptance variables $\delta_{11}$ and $\delta_{12}$ and that they are in quadrature. Equation 31 shows that the signal transmitted past the slot to port 4 is completely independent of $\delta_{11}$ and $\delta_{12}$. There will, in fact, be a slight effect on $V^{trans}$ if $\delta_{11}$ and $\delta_{12}$ are controlled in such a way as to vary the power coupled out of the slot 21. This effect does not show in the Equation 31 because of the limitations imposed on the stub insertion.

Control of $\delta_{11}$ and $\delta_{12}$ to provide pure phase control is of most interest if the present invention is to be used in a phase scanning array. For the special case in which an antenna beam is to be continuously scanned in one angular direction, it is necessary for the phase of each radiating element to vary uniformly with time.

If the following equations are satisfied $$\delta_{11}=\delta_{11}\sin\Omega t=K\Delta_{11}\sin\Omega t$$

$$\delta_{12}=\delta_{11}\cos\Omega t=K\Delta_{11}\cos\Omega t \quad (32)$$

where $\Omega t$ is the angular velocity of the control signal the uniform variation will be achieved since Equation 30 transforms to $$V^{out}=\frac{\delta_{11}V}{\sqrt{2}}e^{-j\Omega t} \quad (33)$$

The radiating element is still well matched since, from Equation 15 and the condition of Equation 8, $$Z=Z_0\left[1+\delta_{11}^2\cos^2\left(\Omega t+\frac{\pi}{4}\right)\right]\leq Z_0[1+(0.05)^2]=1.003Z_0 \quad (34)$$

Again, by the use of Equation 30, the maximum amount of slot coupling that may be achieved under the assumptions and limitations imposed in this analysis is readily calculated to be $$\left|\frac{V^{out}}{V}\right|=\frac{1}{\sqrt{2}}\sqrt{\delta_{11}^2+\delta_{12}^2}=\delta_{11}=0.05 \quad (35)$$

Before describing an exemplary implementation for the voltage control of the susceptances 13 and 14 of FIG. 1 by position control of stubs 25 and 26 shown in FIG. 3, it should be noted that each stub is controlled by a separate control signal generator of a scanning control source 27 represented in FIG. 3 by generators 28 and 29. For phase scanning, the generators 28 and 29 control the stubs 25 and 26 in accordance with the Equations 32.

Figure 6:
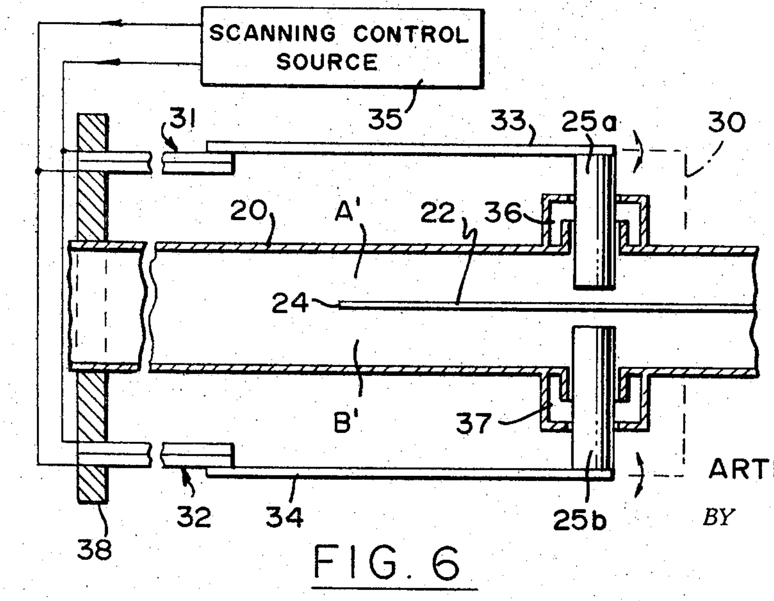
FIG. 6 shows an illustrative realization of variable susceptive elements for the appartus of FIG. 3.

Referring now to FIG. 6, an illustrative realization for the variable susceptive stubs is shown for the stub 25 of FIG. 3 as comprising a pair of half stubs 25*a* and 25*b* ganged together by a link represented by a dashed line 30. A pair of bimorph benders 31 and 32 drive the respective half stubs 25*a* and 25*b* in the same direction through motion-amplifying arms 33 and 34 in response to an electrical scanning signal from a source 35. Annular quarter-wavelength chokes 36 and 37 isolate the branches A′ and B′ from the surrounds to avoid loss of energy as the half stubs 25*a* and 25*b* move toward and away from the septum in a complementary manner.

Each of the bimorph benders consists of two transverse piezoelectric plates cemented together in such a manner that one plate contracts and the other expands in response to an electrical signal of a given polarity, thus producing a bending of the combination in proportion to the amplitude of a potential applied to them. The benders are cantilever mounted in a supporting frame 38 such that their free ends are allowed to move as they bend in one direction for a signal of one polarity and in the opposite direction for a signal of the opposite polarity. The arms 33 and 34 amplify the bending motion to match the maximum available bending motion of the bimorph benders to the dimensions of the branches 25*a* and 25*b*.

The stubs 25*a* and 25*b* are shown ganged together for equal and complementary displacement in the branches A′ and B′. The stub 26 of FIG. 3 would be similarly divided into two ganged stubs for control with bimorph benders supported from one side of the waveguide 20.

An advantage of the present invention is that for phase control of the transmitted or radiated signal, the controlling voltages are simple sine and cosine functions as indicated by Equations 32. This results in a simple phase controlling network and there is no limit to the number of degrees of phase shift that each element can introduce into the radiated signal. For each cycle of the sine-cosine functions of Equations 32, a phase shift of 360° is generated.

Amplitude control over the signal can be obtained by simply raising or lowering the peak amplitude of the sine and cosine voltages used for phase control. The controlling network for amplitude is therefore almost equally simple. In general, amplitude control is achieved through unequal displacement of stubs in their respective branch lines. Since they are a quarter guide wavelength apart, it may be readily seen that control of displacement (height of stub in a given branch) will control input impedance and therefore power division between branches.

For control of susceptance without resort to such electromechanical elements as bimorph benders, other forms of voltage variable capacitances may be employed in the arms A′ and B′. For example, when less lossy varactor diodes become practical, one diode may be provided for each half stub. Other variations and modifications will readily occur to one skilled in the art. Accordingly, it is not intended that the scope of the invention be determined by the disclosed exemplary embodiment, but rather should be determined by the true spirit and scope of the invention as pointed out by the appended claims.

What is claimed is:

1. A method of controlling the phase and amplitude of a signal coupled from a rectangular waveguide through an edge slot therein by dividing the traveling waves in said waveguide into two equal branches by a conductive septum terminating at the leading edge of said slot and varying separately the susceptance of each of said branches.

2. Apparatus for phase and amplitude control of a signal coupled from a rectangular waveguide through a perpendicular edge slot therein comprising:

a septum of conductive material bifurcating said waveguide, said septum being parallel to walls of said waveguide normal to said slot and terminating at a leading edge of said slot, thereby forming two branches of a T-junction feeding said slot; and separate means for varying the susceptance of each of said two branches.

3. Apparatus as defined in claim 2 wherein said means comprises a pair of variable capacitive elements one fourth of one guide wavelength apart along the line of wave travel in each of said two branches with the closest element of each pair approximately a fourth of one guide wavelength from the center of said slot.

4. Apparatus as defined in claim 3 wherein each of said pair of capacitive elements comprises a stub of conductive material, and means for controlling the penetration of said stub into its associated branch in a direction normal to said septum.

5. Apparatus as defined in claim 4 wherein capacitive stubs aligned on opposite sides of said septum and near the leading edge thereof are ganged together for control such that when penetration of a branch is increased by one, penetration of the other branch is decreased by the other capacitive stub by an equal amount, and both stubs of a given pair are controlled in a predetermined manner for phase control of a signal coupled out of said slot.

6. Apparatus as defined in claim 4 wherein said pair of capacitive stubs in a given one of said two branches are separately controlled as to penetration of said given branch for amplitude control of energy coupled through said slot by unequal penetration of separate ones of said pair of capacitive stubs in said given one of said two branches.

7. Apparatus as defined in claim 4 wherein capacitive stubs aligned on opposite sides of said septum and near the leading edge thereof are ganged together for control such that when penetration of a branch is increased by one, penetration of the other branch is decreased by the other capacitive stub by an equal amount, and both stubs of a given pair are controlled independently for phase and amplitude control of a signal coupled out of said slot.

8. Apparatus as defined in claim 7 wherein both stubs of said given pair are controlled independently according to a sine and cosine of a variable for phase shift of a signal coupled out of said slot with constant amplitude.

9. Apparatus as defined in claim 8 wherein said variable is angular velocity.

10. Apparatus for controlling the amplitude and phase of a signal to be transmitted, comprising:

a waveguide adapted to receive said signal to be transmitted having an edge slot perpendicular to broad walls thereof;

a septum bifurcating said waveguide immediately in front of said edge slot;

first and second variable capacitive devices on each side of said septum spaced a quarter guide wavelength apart along a line parallel to narrow side walls of said waveguide with a space of approximately a quarter guide wavelength between said edge slot and said second capacitive device;

a space between an edge of said septum opposite the edge in front of said edge slot and said first capacitive device equal to half the space between said first and second capacitive devices; and means for controllably varying the variable capacitive devices so as to vary the susceptances of the two branch arms formed by the bifurcating septum to control the amplitude and phase of the divided signal in each of the two branch arms, whereby control is provided over the phase and amplitude of a combined signal transferred into the edge slot.

11. Apparatus as defined in claim 10 wherein said first and second capacitive devices each comprises a stub of conductive material which may be inserted a variable amount into space between a broad wall of said waveguide and said septum in a direction normal to said septum.

12. Apparatus as defined in claim 11 wherein stubs of corresponding ones of said first and second capacitive devices are aligned on opposite sides of said septum and ganged together in corresponding pairs such that when a given stub of one pair is moved a given increment into its space in said waveguide, the other stub of said pair is moved out of its space in said waveguide by said given increment.

13. Apparatus as defined in claim 12 wherein stubs of said first and second capacitive devices are controlled to provide respective susceptances variable as sine and cosine functions of angular velocity of a control signal to provide control of signal transmission through said slot with constant amplitude and uniform variation in phase with time.

References Cited

UNITED STATES PATENTS

| | | | |
|---|---|---|---|
| 2,266,868 | 12/1941 | Jäkel | 333—9X |
| 2,666,132 | 1/1954 | Barrow | 324—58X |

| | | | |
|---|---|---|---|
| 2,882,500 | 4/1959 | Lewin et al. | 333—9X |
| 3,108,237 | 10/1963 | Reuvers et al. | 343—778X |
| 3,109,152 | 10/1963 | Dachert | 333—31 |
| 3,346,823 | 10/1967 | Maurer et al. | 333—31X |

OTHER REFERENCES

"Principles and Applications of Waveguide Transmission"—Southworth D. Van Nostrand Co., Inc. New York, N.Y., September 1961, QC 661 568, pages 338–342.

ELI LIEBERMAN, Primary Examiner

M. NUSSBAUM, Assistant Examiner

U.S. Cl. X.R.

333—11, 31; 343—771, 854